United States Patent [19]
Sheffield

[11] Patent Number: 4,792,004
[45] Date of Patent: Dec. 20, 1988

[54] WEIGHT SCALE FOR A HYDRAULIC LOADER AND RELATED METHOD

[76] Inventor: Richard Sheffield, Rt. 2, Box 1077, Ft. Gibson, Okla. 74434

[21] Appl. No.: 101,362

[22] Filed: Sep. 25, 1987

[51] Int. Cl.$^4$ .................. G01G 19/10; G01G 5/04
[52] U.S. Cl. ............................. 177/141; 177/146; 177/208
[58] Field of Search ............... 177/141, 146, 208–209

[56] References Cited

U.S. PATENT DOCUMENTS

| | | | |
|---|---|---|---|
| 2,635,868 | 4/1953 | Reid et al. | 177/141 X |
| 2,742,162 | 4/1956 | Mandt | 177/141 X |
| 2,851,171 | 9/1958 | Martin et al. | 177/141 X |
| 3,061,117 | 10/1962 | Kruse | 177/141 X |
| 3,231,035 | 1/1966 | Wise . | |
| 3,263,762 | 8/1966 | Langager et al. . | |
| 3,431,992 | 3/1969 | Whitecar . | |
| 3,724,571 | 4/1973 | Thorn et al. . | |
| 4,039,084 | 8/1977 | Shinohara et al. | 177/146 X |
| 4,055,255 | 10/1977 | Vasquez | 177/147 |
| 4,230,196 | 10/1980 | Snead | 177/141 |
| 4,456,084 | 6/1984 | Miller . | |
| 4,499,960 | 2/1985 | Ehrich et al. | 177/25 |

Primary Examiner—George H. Miller, Jr.
Attorney, Agent, or Firm—Staas & Halsey

[57] ABSTRACT

A weight scale for a loader operated by a hydraulic system incorporated in equipment and a related method are provided. The scale includes a pressure gauge installed in a hydraulic line of the hydraulic system. The gauge may either be located at a loader boom or the tractor instrument panel. The gauge includes an adjustable pointer to correspond the gauge to the tare weight of the particular loaded it is applied to; a calibration factor which allows the operator to convert from the pressure reading on the gauge to a weight value in pounds or kilograms; and a safety line for warning the operator when the safe load limit of the loader is being surpassed. The method includes the steps of: lifting an object on the loader; sensing the pressure exerted in the system by the gauge when the object is lifted by the loader; displaying the pressure; and converting the pressure displayed to a weight value based on the predetermined calibration factor.

3 Claims, 2 Drawing Sheets

WEIGHT SCALE FOR A HYDRAULIC LOADER AND RELATED METHOD

BACKGROUND OF THE INVENTION

This invention relates to a weight scale and, more particularly, to a weight scale for use on a farm hydraulic loader to weigh large bales of hay, and a related method.

Hay is generally handled in large units such as large round or large, square bales, or small bales that are accumulated in groups of 8 to 12 bales after baling. Each hay bale, or group is usually picked up with a tractor equipped with a front or rear hydraulic loader or lift and placed on trucks or trailers, or transported directly on the loader, to a storage facility, where the bales of hay are weighed on a separate scale. The hydraulic loaders are of various sizes and loading capacities and are manufactured by a number of different companies.

Several devices for measuring the weight of material placed on hydraulically controlled loaders or lifts are known. For example, U.S. Pat. No. 4,491,190, discloses a fork lift weight scale which includes a calibrated gauge, indicating the weight being lifted. U.S. Pat. Nos. 4,055,255; 3,589,459; and 3,154,160 also show hydraulically actuated gauges used with large lifting or loading devices.

With each of the conventional devices discussed above, incorporation of the weight scale requires an elaborate and expensive overall apparatus. In addition, each weight scale is usually designed for a specific piece of heavy equipment to perform a specific function.

Since hay is generally priced and sold by the ton and because the majority of farms have at least one tractor with a hydraulic loader or lift, a great need exists for a device and method for accurately measuring the weight raised by the loader, said device and method being quick, simple, economical and easily integrated into either a new or existing hydraulic loader.

SUMMARY OF THE INVENTION

Accordingly, it is an object of the present invention to provide a simple and economical weighing device and related method capable of establishing a weight for a load that is being lifted, such as a bale of hay, the moment the load is suspended on a loader or lift.

It is another object of the present invention to provide a weighing device which can be incorporated into virtually any existing or new tractor or loader utilizing a hydraulic lifting system.

It is another object of the present invention to provide a weight scale for a hydraulic loader and related method capable of informing the tractor operator when the safe lifting limit of the loader is being exceeded.

Finally, it is an object of the present invention to provide a weight scale for a hydraulic loader and related method which eliminate the need to utilize a scale separate from the loader for weighing the load.

To achieve the foregoing and other objects of the present invention, and in accordance with the purposes of the invention, there is provided a weight scale for a hydraulic loader and a related method for accurately weighing objects such as hay bales.

The scale includes a pressure gauge incorporated into the hydraulic system of a farm tractor loader. The gauge is installed in the hydraulic line between the lift cylinder and the control valve that controls the cylinder. The gauge may be located on the loader boom or it can be installed on, or near, the tractor instrument panel by using an additional hydraulic feed line, connected between the gauge and the hydraulic line that feeds the lift cylinder. The gauge includes a pointer which can be adjusted to the tare weight of the particular loader to which it is attached. The gauge can also be calibrated to pounds or kilograms, based on the proportional pressure exerted in the hydraulic system when a bale of hay is lifted by the loader. The gauge registers within a reasonable degree of accuracy a net weight of the hay bale or other material being handled.

The method includes the steps of: lifting an object on the loader; sensing the pressure exerted in the hydraulic line by the gauge when the object is lifted; displaying the pressure; and converting the pressure displayed to a weight value based on a predetermined calibration factor.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
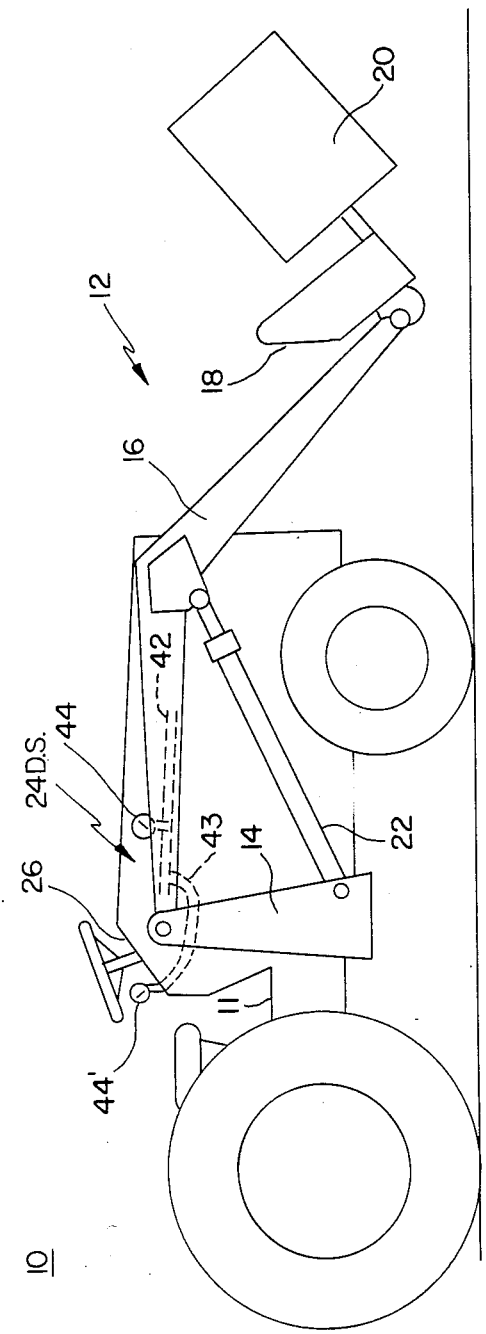
FIG. 1 is a left side elevational view of a farm tractor with a loader.

Referring to the drawings herein, FIG. 1 is a left side view (looking from the front) of a piece of heavy equipment such as a farm tractor 10 incorporating a operators platform 11 and a hydraulic loader 12. Although a front loader 12 is shown and discussed in detail herein, it is to be understood that the present invention is equally applicable to a hydraulically actuated rear loader or three-point lift.

The loader 12 is relatively conventional and includes a mast 14, a boom 16, a bale spear assembly 18 for receiving a bale of hay 20, and a lift cylinder 22. As known in the art, the right side of the loader 12 includes identical, connected members to those described above for the left side.

Hydraulic loaders usually have hydraulic hose connections at an area 24 near where the boom 16 meets the mast 14. This area is the preferred place of installation of the high pressure hydraulic gauge 44 of the present invention described in detail below due to the convenience of connection to the hydraulic line 42 and because this area 24 can normally be readily seen by the tractor 10 operator. The gauge 44 can instead be mounted on or near the instrument panel 26 by using an additional hydraulic feed line 43 which transports hydraulic fluid, and thus pressure, to the gauge indicated by reference numeral 44' in FIG. 1. When a gauge 44 is used with a rear hydraulic lifter, mounting the gauge 44' towards or upon the instrument panel 26 is desirable because most of the hydraulic connections on rear lifts are behind or below the operator.

Figure 2:
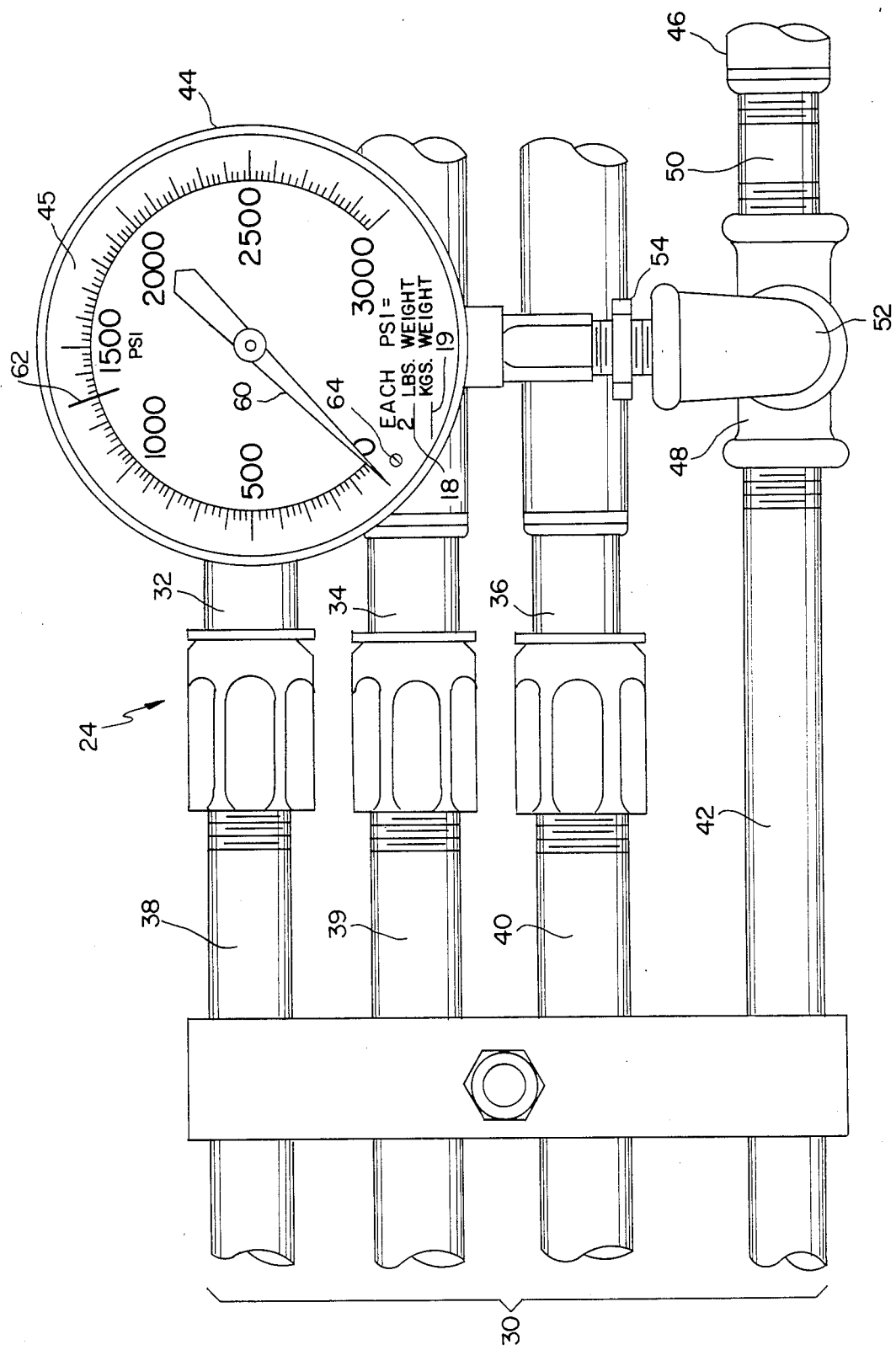
FIG. 2 is a side, cut away view of the pressure gauge according to the present invention incorporated into the hydraulic system of the tractor shown in FIG. 1.

As shown in FIG. 2 and as known in the art, the tractor 10 hydraulic system 30 furnishes hydraulic force to the loader 12 by using hydraulic hoses 32, 34, 36 connected to loader piping 38, 39 and 40, respectively.

The lift cylinders 22 are pressurized by the tractor hydraulic system 30 through hydraulic line 42.

FIG. 2 also shows a location on the hydraulic line 42 where the gauge 44 according to the present invention may be installed. In FIG. 2 the gauge 44 is shown facing outward in order to better illustrate the dial 45 of the gauge 44. Under normal conditions, however, the gauge 44 would be turned toward the operator of the tractor 10 so that the operator can easily see the gauge 44 and determine the amount of weight loaded.

Alternatively, as suggested above, the gauge 44 can be installed inside the cab area 11 of the tractor 10. For example, the additional hydraulic feed line 43 can be connected between the hydraulic line 42 and the gauge 44' mounted on the instrument panel 26 of the tractor 10 as indicated in FIG. 1.

Installation of the gauge 44 into the hydraulic line 42 is as follows. Hydraulic line 42 and hose end 46 are unscrewed and a tee adaptor 48 and nipple 50 are installed between the hydraulic line 42 and the hose end 46. Next, street ell 52 and bushing 54 are installed into the tee adaptor 48. Finally, the gauge 44 is attached at the bushing 54. This connection allows the gauge 44 to be turned to any desired angle for optimum viewing by the operator.

The gauge 44 would preferably be a liquid filled gauge for heavy duty applications and a relatively less expensive, plain, dry gauge for light duty use. The gauge 44 is capable of translating a "pounds per square inch" (psi) reading into pounds or kilograms of weight as discussed in detail below.

An adjustable pointer 60 is provided on the gauge 44, which is necessary in order to adjust gauge 44 to the respective loader 12 upon which installation is occurring. Due to the many different makes and sizes of loaders and lifts an adjustable gauge is necessary, as each loader or lift will have its own tare weight reading that will have to be compensated for. That is, different makes of loaders give different psi readings upon picking up the same load.

FIG. 2 also shows in detail the dial 45 of gauge 44. The dial 45 includes a safety line 62, such as a red strip or notch applied to the dial 45 of gauge 44, corresponding to a point where the maximum rated load of the tractor 10 is reached. Due to the safety line 62, the tractor operator can quickly and easily see when he is attempting to load a weight which exceeds the safe limits of the tractor, which would cause dangerous situation. An adjusting screw 64 is used to set the adjustable pointer 60 to 0 (zero) when the gauge 44 is installed and the no load weight of the loader boom 16 and bale spear assembly 18 is hydraulically supported by the lift cylinders 22. Space 18 on dial 45 corresponds to lbs (pounds), whereas space 19 corresponds to kgs (kilograms). These spaces 18, 19, are used to record a calibration factor as discussed below. Numbers are applied to the spaces 18, 19, where applicable, in order to record the calibration factor of the gauge 44 in relation to the particular loader 10 upon which the gauge 44 is installed.

More particularly, as stated above, the adjusting screw 64 and pointer 60 are necessary because each loader 12 or lifter upon which the gauge 44 is installed will have a different tare weight. By using an adjustable pointer 60 the gauge 4 can be set to 0 (zero) before the loader 12 lifts an object to be weighed.

One way to calibrate the gauge 44 for use with a particular loader 12, is to lift a known weight, for example, a large bale of hay 20 that has been weighed previously and found to be 1,200 pounds. With the adjustable pointer 60 of gauge 44 set at 0 (zero) the bale 20 of hay is lifted and the pointer 60 advances to 600 psi. Therefore, it can be determined that for this particular loader 12, the gauge 44 senses 2 pounds of weight for each 1 pound of pressure. By applying numbers using, e.g. an adhesive indicia or a marker, the number "2" is affixed to gauge 44 at space 18 on the dial 45 as shown in FIG. 2. The gauge 44 is now calibrated to read that each one psi equals two pounds of weight. The same procedure as described above is used to calibrate the gauge 44 to kilograms, but a bale 20 weighed in kilograms must be used, or a conversion from pounds to kilograms can be made. If the next load lifted shows 750 psi, then the load lifted is determined to weigh 1,500 lbs.

It is to be understood that this method of weighing is not 100% accurate, but the margin of error is small. When used for the intended purpose, it is a very useful tool that takes the guess work out of weighing hay in the field.

Alternatively, with the gauge 44 installed, the loader 12 can be raised to approximate the height that normal loads to be weighed clear the ground. The adjustable pointer is set to 0 and a load is picked up and the gauge is read, e.g. 600 psi. This load is then taken to an accurate scale and weighed. This weight is divided by the psi reading that appeared on the gauge 44. As a result, each unit of psi=x number of pounds. For example, if a gauge reading is 600 psi and the load weighed is 1000 pounds, each pound of psi pressure=1.666 pounds of wt. As another example, if the psi reads 700, 700×1.666 gives a weight of 1166 pounds. Kilograms can be similarly calculated. The calibration factor will apply to all weights on this particular loader 12.

As stated above, the safety line 62 is installed to correspond to the maximum rated load the loader 10 can safely lift. According to the first example above, where one psi equals two pounds, if the maximum rated load is 2,600 pounds then the safety line 62 is affixed at a point on the dial 45 showing 1,300 psi, as shown in FIG. 2.

By installation of this pressure gauge 44 on farm tractors 10 having hydraulic loaders 12, the loader 12 becomes a more useful piece of equipment because the operator is able to tell immediately how much weight is being handled. The operator can also immediately tell whether the bales 20 are uniform in weight, as well as what each bale 20 weighs. Further, even though numerous farm hydraulic loaders are on the market, the present invention can be calibrated to the particular farm hydraulic loader used. Moreover, as can readily be seen, the present invention will greatly increases the efficiency and accuracy of handling hay and any other items such as logs, sand, gravel, grain, vegetables, etc. that are handled with a hydraulic loader. Additionally, by sensing when the maximum load limit is reached, the present invention provides a greater degree of safety, because any given loader and tractor is designed to operate within a maximum load limit and operating above the design load limit may upset the tractor, injuring the operator, or damaging the loader or tractor. Moreover, the present invention is much more cost efficient than the prior art devices. The devices disclosed in U.S. Pat. Nos. 4,491,190; 4,055,255; 3,154,100; and 3,589,459 include a series of valves, lines and other mechanisms added to the base equipment. Each of these patented devices costs at least four hundred dollars, but more likely one thousand dollars or more. The present invention is simply added to the hydraulic system of any loader and costs in the range of sixty dollars or less. Also, the present invention is more versatile than the patented devices since the gauge 44 can be installed in the rear three-point lift system of a tractor 10 by installing the gauge 44 in the hydraulic line that feeds this lift system.

The foregoing is considered illustrative only of the principles of the invention. Further, since numerous modifications and changes will readily occur to those skilled in the art, it is not desired to limit the invention to the exact construction and operation shown and described. For example, this invention is not limited to weighing hay, as any material or items handled by a hydraulically controlled loader or lift could also be weighed. This invention would be used primarily, but is not limited to, farm tractors with front loaders or rear three point lifts. Accordingly, all suitable modifications and equivalents may be resorted to, falling within the scope of the invention and the appended claims.

What is claimed is:

1. A weight scale for a loader operated by a hydraulic system and incorporated on an operator controlled vehicle, comprising:

(a) a hydraulic line for operating the loader; and
    (b) a gauge in pressure communication with the hydraulic line, said gauge being directly responsive to changes in hydraulic pressure in the hydraulic line and visually indicating the changes in pressure thereon, the gauge including
        (i) a movable pointer adjustable to a tare weight of the loader with which the gauge is used,
        (ii) a dial having a series of indicia representing different pressures, and
            (iii) a predetermined calibration factor for converting the pressure indicated to a weight value,
    wherein, when an object is lifted by the loader, a pressure is visually indicated on the dial by the pointer, which can be converted by the operator of the vehicle to the weight value based on the calibration factor for said loader.

2. The scale as recited in claim 1, wherein the weight value is selected from the group comprising pounds and kilograms.

3. The scale as recited in claim 2, wherein the dial further comprises a line representing the safe lifting capacity of the loader.

* * * * *